(12) United States Patent
Pinnegar et al.

(10) Patent No.: US 7,401,006 B2
(45) Date of Patent: Jul. 15, 2008

(54) METHOD AND SYSTEM FOR SIGNAL PROCESSING USING A SPARSE APPROXIMATION OF THE S-TRANSFORM

(75) Inventors: Charles Robert Pinnegar, Calgary (CA); Ross Mitchell, Calgary (CA)

(73) Assignee: Calgary Scientific Inc., Calgary, Alberta (CA)

( * ) Notice: Subject to any disclaimer, the term of this patent is extended or adjusted under 35 U.S.C. 154(b) by 0 days.

(21) Appl. No.: 11/442,991

(22) Filed: May 31, 2006

(65) Prior Publication Data

US 2007/0027657 A1 Feb. 1, 2007

Related U.S. Application Data

(60) Provisional application No. 60/685,539, filed on May 31, 2005.

(51) Int. Cl.
*G06F 3/023* (2006.01)
(52) U.S. Cl. .................. 702/189; 702/183; 702/196
(58) Field of Classification Search .............. 702/106, 702/118–120, 123, 128, 191; 324/307; 345/582; 359/560; 346/582
See application file for complete search history.

(56) References Cited

U.S. PATENT DOCUMENTS

| | | | | |
|---|---|---|---|---|
| 5,253,329 | A * | 10/1993 | Villarreal et al. ............ | 706/31 |
| 5,831,883 | A * | 11/1998 | Suter et al. ................. | 708/404 |
| 6,850,062 | B2 * | 2/2005 | Mitchell et al. ............. | 324/307 |
| 7,012,749 | B1 * | 3/2006 | Mendlovic et al. .......... | 359/560 |
| 2005/0253863 | A1 * | 11/2005 | Mitchell et al. ............. | 345/582 |
| 2006/0080067 | A1 * | 4/2006 | Feldmann et al. ............ | 703/2 |

OTHER PUBLICATIONS

Varanini et a., Spectral Analysis of Cardiovascular Time Series by the S-Tranform, 1997, IEEE, Computers in Cardiology, vol. 24, pp. 1-1 abstract, and pp. 383-386.*
Stockwell R.G., Mansinha L., Lowe R.P., "Localization of the complex spectrum: the S-transform", IEEE Trans. Signal Process, 1996; 44, 998-1001.
Pinnegar, C.R., Mansinha L., "Time-local spectral analysis for non-stationary time series. The S-transform for noisy signals", Fluctuation and Noise Letters 3, L357-L364 (2003).
Pinnegar, C.R., Time-frequency and time-time filtering with the S-transform and TT-transform, Dig. Signal Process (in press).

* cited by examiner

*Primary Examiner*—Andrew H Hirshfeld
*Assistant Examiner*—Felix Suarez
(74) *Attorney, Agent, or Firm*—Freedman & Associates

(57) ABSTRACT

The present invention relates to a method and system for processing time series signal data or image signal data indicative of a characteristic of an object. Received signal data are transformed into second signal data within a Stockwell domain based upon a sparse approximation of a S-transform of the signal data. The second signal data are then processed within the Stockwell domain to extract features therefrom. The processing includes determination of local spectra at predetermined locations; determination of voices at predetermined frequencies; and filtering of the signal data using a filter function in dependence upon frequency and time or space. The signal processing method and system according to the invention enables signal processing based on the S-transform using a desktop computer or workstation.

25 Claims, 12 Drawing Sheets

US 7,401,006 B2

METHOD AND SYSTEM FOR SIGNAL PROCESSING USING A SPARSE APPROXIMATION OF THE S-TRANSFORM

This application claims benefit from U.S. Provisional Patent Application No. 60/685,539 filed May 31, 2005 the entire contents of which are incorporated herein by reference.

FIELD OF THE INVENTION

This invention relates to signal processing, and in particular to a signal processing method and system based on a sparse approximation of the S-transform.

BACKGROUND OF THE INVENTION

The Fourier transform of a function h(t) has served as the most important transform in numerous signal processing applications. For example, the Fourier transform is widely used in medical imaging techniques such as Computed Tomography (CT) and Magnetic Resonance Imaging (MRI).

Standard Fourier analysis reveals individual frequency components involved in a signal or an image. However, in many situations of frequencies changing over time or space, the standard Fourier analysis does not provide sufficient information. In numerous applications, frequencies changing over time or space reveal important information. For example, in MRI signal processing, motion caused by respiratory activity, cardiac activity, and blood flow causes temporal changes in a time series signal.

Time-Frequency Representations (TFRs) are capable of localizing spectra of events in time, thus overcoming the deficiency of the standard Fourier analysis and providing a useful tool for signal analysis in numerous applications. However, all TFRs have a substantial disadvantage that hamper or even block their application in present signal processing methods and systems. All TFRs require substantially increased computer memory storage, as well as substantially longer program execution time, compared to the corresponding requirements of the Discrete Fourier Transform (DFT).

One such TFR is the Stockwell-transform (S-transform) disclosed in: Stockwell R. G., Mansinha L., Lowe R. P., "Localization of the complex spectrum: the S-transform", IEEE Trans. Signal Process, 1996; 44, 998-1001. The S-transform is a spectral localization transform that uses a frequency adapted Gaussian window to achieve optimum resolution at each frequency. Employment of the S-transform is highly beneficial in numerous applications. For example, a one-dimensional version of the S-transform applied to time series signal data, such as time course functional MRI (fMRI) data, enables localizing and removing of noise components and artifacts, while a two dimensional version of the S-transform provides local textural information for each point in an image. This gives a texture map of an MRI image that enhances differences, indicating lesions or other abnormalities due to disease activity that are difficult to distinguish in conventional MR images. Unfortunately, the system requirements of the S-transform regarding computer memory storage, as well as execution time, prohibit employment of this highly beneficial signal processing tool in a clinical setting.

It would be advantageous to overcome the drawbacks of the S-transform by providing a signal processing method and system, based on the S-transform but having substantially reduced system requirements. Such a signal processing method and system based on the S-transform would be highly beneficial, not only for signal processing in medical applications, but in numerous other industrial and scientific applications.

SUMMARY OF THE INVENTION

It is, therefore, an object of the invention to provide a signal processing method and system based on a sparse approximation of the S-transform.

It is further an object of the invention to provide a signal processing method and system based on a sparse approximation of the S-transform for signal data analysis and filtering.

In accordance with the present invention there is provided a method for processing signal data indicative of a characteristic of an object comprising:
receiving the signal data, the signal data being one of time series signal data and image signal data;
transforming the signal data into second signal data within a Stockwell domain based upon a sparse approximation of an S-transform of the signal data; and,
processing the second signal data within the sparse Stockwell domain to extract features therefrom.

In accordance with the present invention, there is further provided a storage medium having stored therein executable commands for execution on a processor, the processor when executing the commands performing:
receiving the signal data, the signal data being one of time series signal data and image signal data;
transforming the signal data into second signal data within a Stockwell domain based upon a sparse approximation of an S-transform of the signal data; and,
processing the second signal data within the sparse Stockwell domain to extract features therefrom.

In accordance with the present invention, there is yet further provided a system for processing signal data indicative of a characteristic of an object comprising:
an input port for receiving the signal data, the signal data being one of time series signal data and image signal data;
a processor in communication with the first port for:
transforming the signal data into second signal data within a Stockwell domain based upon a sparse approximation of an S-transform of the signal data; and,
processing the second signal data within the sparse Stockwell domain to extract features therefrom; and,
an output port in communication with the processor for providing at least a portion of the processed second signal data.

BRIEF DESCRIPTION OF THE FIGURES

Exemplary embodiments of the invention will now be described in conjunction with the following drawings, in which:

FIG. 4a is a diagram illustrating the real part of the full S-spectrum shown in FIG. 1a;

FIG. 7c is a diagram illustrating a spatial domain basis function associated with the (42, 25) wave-vector in FIG. 7a;

FIG. 7d is a diagram illustrating a spatial domain basis function associated with the (42, 25) wave-vector in FIG. 7a;

FIG. 10a is a diagram illustrating a 128×128 synthetic image whose quadrants contain different two-dimensional cosines;

FIG. 10b is a diagram illustrating the error of the image reconstructed from the sparse S-transform of the image shown in FIG. 10a;

FIG. 10c is a diagram illustrating a filtered image obtained by applying four space-wave-vector filters to the image shown in FIG. 10a;

FIG. 10d is a diagram illustrating information filtered from the image shown in FIG. 10a to produce the image shown in FIG. 10c;

DETAILED DESCRIPTION OF THE INVENTION

Figure 1A:
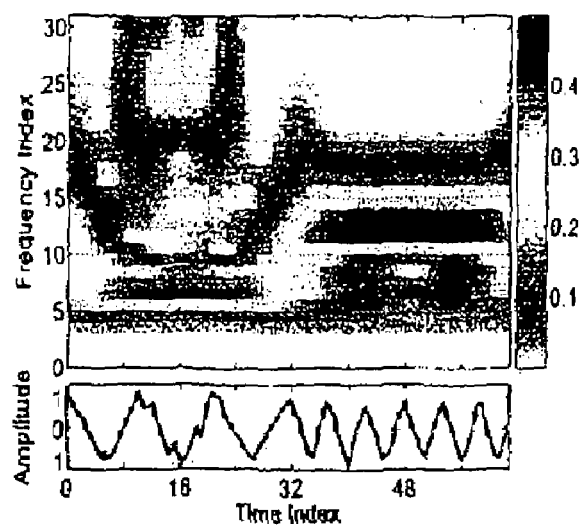
FIGS. 1a and 1b are diagrams illustrating a full S-spectrum and a modified S-spectrum, respectively, of a 64-point time series shown in subplots.

A discrete expression of the S-transform is given as:

$$S(\tau, f) = \sum_{t=0}^{M-1} h(t) \left\{ \frac{|f|}{\sqrt{2\pi} M} \exp\left( \frac{-f^2(\tau-t)^2}{2M^2} \right) \right\} \exp\left( \frac{-2\pi i f t}{M} \right). \quad (1)$$

In equation (1), h(t) is a time series signal, M is the number of points in h, and t and f are integer time and frequency indices, respectively. Therefore, if T is a sampling interval, tT gives time in seconds and f/MT gives frequency in Hz. The time-frequency resolution of the S-transform is provided by a scalable Gaussian window—the term in braces in equation (1) and subsequent equations—whose width varies inversely with |f|, ensuring that the same number of cycles of the Fourier sinusoid are retained at each frequency. The width scaling of the S-transform window is reminiscent of wavelets and, like continuous wavelet transforms, the modulus |S(τ,f)|—also called the S-spectrum—has better frequency resolution at low frequencies, and better time resolution at higher frequencies.

Since the S-transform window contains both f and t, it is not possible to evaluate the expression of $S(\tau,f)$ in equation (1) using a DFT process. Fortunately, it is possible to derive from equation (1) an alternative expression of $S(\tau,f)$ that is better suited for fast calculation. Based on the fact that the S-transform window is a function of (τ-t), it is possible to describe equation (1) as a convolution of the window with h(t)exp(-2πift/M). Since convolution in the time domain is equivalent to multiplication in the Fourier domain, equation (1) is rewritten as an inverse DFT, giving:

$$S(\tau, f) = \frac{1}{M} \sum_{\alpha=-M/2}^{M/2-1} H(\alpha+f) \left\{ \exp\left( \frac{-2\pi^2 \alpha^2}{f^2} \right) \right\} \exp\left( \frac{2\pi i \alpha \tau}{M} \right). \quad (2)$$

Here α has units of frequency, H(α) is the DFT of h(t), and the term in braces is the Fourier-domain form of the S-transform window. Equation (2) has the advantage that for any particular value of f, a full "voice"-S(τ,f) at all τ—is obtained from an M—point inverse DFT. Thus calculation of each voice comprises approximately 5M $\log_2$ M operations, with each voice containing M entries. Only values of f from 0 to M/2 need to be considered, because S(τ,f)=S*(τ,-f), with the asterisk denoting complex conjugation. Accordingly, S(τ,f) has approximately $M^2/2$ complex elements, whose calculation comprises approximately $(5M^2/2)\log_2$ M operations. By comparison, H(f) requires approximately 5M $\log_2$ M operations to calculate M/2 complex elements. When M is less than about $10^3$, the "full" S-transform is relatively quick to calculate and needs relatively little memory storage. However, if the signal h(t) contains, for example, $10^6$ samples, it is evident that $(5M^2/2)\log_2$ M operations will take a long processing time and, more importantly, the $M^2/2$ complex elements of the S-transform will need several terabytes of memory storage. Similar problems occur when the S-transform of two-dimensional images is considered. By analogy with equation (2), the two-dimensional S-transform is expressed as:

$$^2S(X, Y, f, g) = \frac{1}{MN} \sum_{\alpha=-M/2}^{M/2-1} \sum_{\beta=-N/2}^{N/2-1} H(\alpha+f, \beta+g) \times \quad (3)$$

$$\left\{ \exp\left( \frac{-2\pi^2 \alpha^2}{f^2} \right) \exp\left( \frac{-2\pi^2 \beta^2}{g^2} \right) \right\} \times \exp\left( \frac{2\pi i \alpha X}{M} \right) \exp\left( \frac{2\pi i \beta Y}{N} \right).$$

Here, the time index τ as been replaced by spatial indices X and Y, and f has been replaced by wavevector indices f and g. Thus, each pixel h(x,y) in an M×N image has an M×N local spectrum, and each wavevector in its two-dimensional Fourier spectrum H(f,g) has an M×N voice. As in the one-dimensional case, symmetry considerations reduce the total number of complex entries of $^2S$ from $M^2N^2$ to $M^2N^2/2$. However, for larger M and N, the $M^2N^2/2$ complex entries will exceed the memory storage capacity of a desktop computer or workstation. Also, the two-dimensional DFTs needed for calculating the $M^2N^2/2$ complex entries will require approximately $5M^2N^2(\log M+\log N)/2$ operations. Consequently, at the present time, calculation and storage of the full two-dimensional S-transform of an image on a desktop computer or workstation is impractical unless $\{M,N\} \leq 100$.

An additional problem of the calculation of equations (2) and (3) arises from the fact that, while voices are relatively fast to calculate since the calculation of each requires only one inverse DFT, the entire S-transform needs to be calculated to obtain an individual local spectrum. Local spectra are also obtained by using equation (1) and its two-dimensional equivalent, but for time series this approach still needs approximately $N^2$ operations per local spectrum, and for images it needs approximately $M^2N^2$ operations per local spectrum, which is not much of an improvement over calculating the full S-transform. This is problematical because $^2S$ is four-dimensional, so it is not possible to view all of the information at once. Therefore, a user will likely need to look at both voices and local spectra to interpret the properties of the S-transform.

FIG. 1a illustrates a 64-point test time series and its full S-spectrum $|S(\tau,f)|$. At low $f$, the S-spectrum $|S(\tau,f)|$ hardly changes from pixel to pixel in the $\tau$ direction. At high $f$, the situation is reversed, with $|S(\tau,f)|$ varying rapidly in the $\tau$ direction but slowly in the $f$ direction. This inherent redundancy of the S-transform is exploited in the signal processing method and system according to the invention. Based on this inherent redundancy, a sparse approximation of the S-transform according to the invention is obtained by retaining only a few pixels in each voice at low $f$, and by omitting complete voices at high $f$. At midrange values of $f$, it is possible to simultaneously decimate in both the $\tau$- and the $f$-directions.

To describe the reasoning behind the decimation across time, we switch from the discrete domain to the continuous domain, using the superscript c to denote continuous equivalents of discrete quantities. The continuous equivalent of equation (1) is:

$$S^c(\tau^c, f^c) = \int_{-\infty}^{\infty} h^c(t^c) \left\{ \frac{|f^c|}{\sqrt{2\pi}} \exp\left( \frac{-(f^c)^2(\tau^c - t^c)^2}{2} \right) \right\} \exp(-2\pi i f^c t^c) dt^c. \quad (4)$$

Here, $\tau^c$, $t^c$, and $1/f^c$ all have units of seconds. Differentiation of equation (4) with respect to $\tau^c$ satisfies $$\frac{1}{(f^c)^2} \frac{\partial^2 S^c(\tau^c, f^c)}{\partial^2 (\tau^c)^2} = B^c(\tau^c, f^c) - S^c(\tau^c, f^c), \quad (5)$$

where $B^c(\tau^c, f^c)$ is an alternative S-transform defined by modifying the Gaussian window of equation (4), to give $$B^c(\tau^c, f^c) = \int_{-\infty}^{\infty} h(t^c) \left\{ \frac{|(f^c)^3|(\tau^c - t^c)^2}{\sqrt{2\pi}} \exp\left( \frac{-(f^c)^2(\tau^c - t^c)^2}{2} \right) \right\} \exp(-2\pi i f^c t^c) dt^c. \quad (6)$$

Figure 1B:
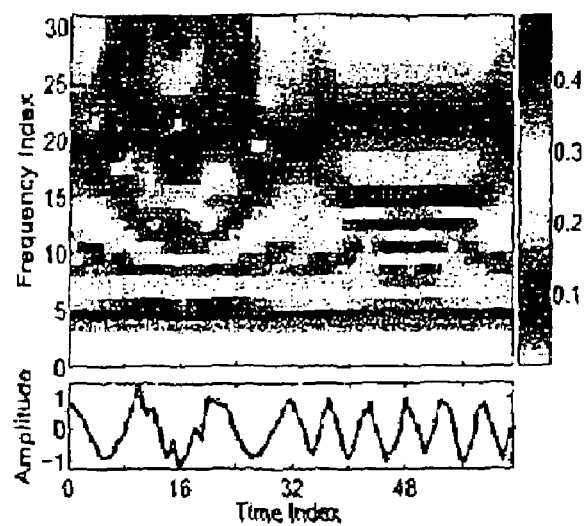
Figure 2A:
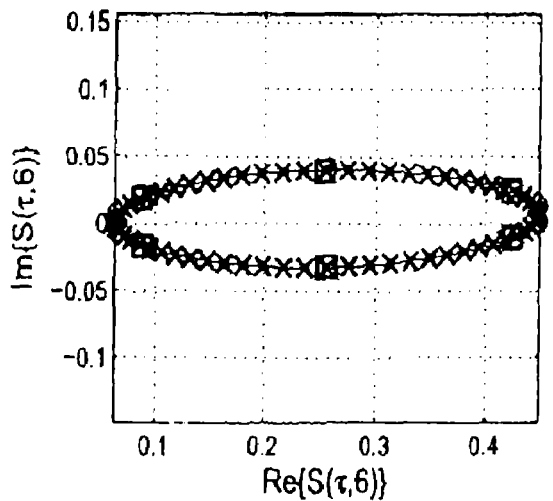
FIGS. 2a to 2d are diagrams illustrating four voices of the full S-transform and its sparse approximation in a complex plane.
Figure 2B:
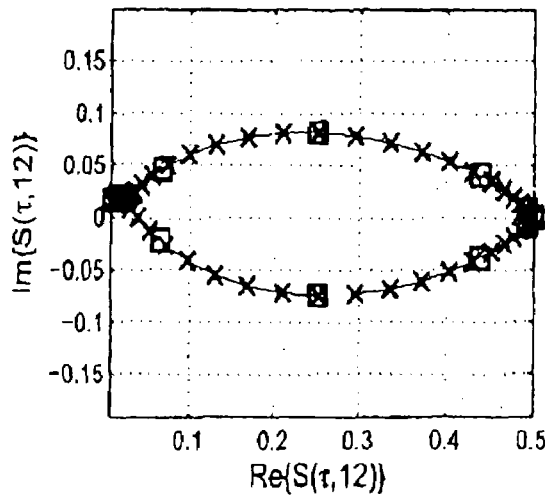
Figure 2C:
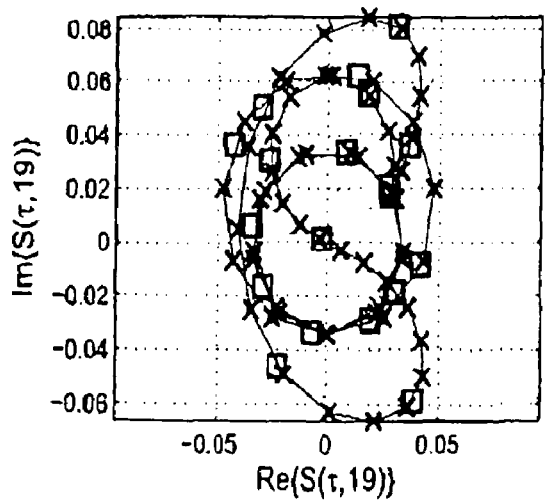
Figure 2D:
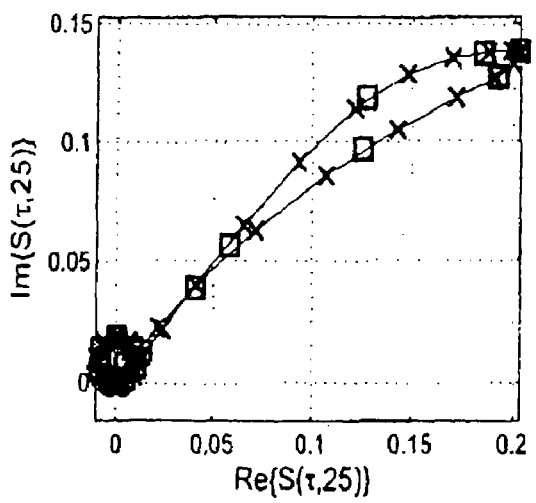

When $f^c$ is held constant, equation (5) describes a perturbed harmonic motion of frequency $f^c$, with the perturbation given by $B^c$. Generally, the maximum amplitude of $|B^c|$ is comparable to that of $|S^c|$—an example of the discrete form of $|B^c|$ is shown in FIG. 1b—but, since $S^c$ and $B^c$ have different windows, their maxima and minima do not always occur at the same locations in the $(\tau^c, f^c)$ plane. Since $S^c$ and $B^c$ are complex quantities, equation (5) has real and imaginary parts, whose separate oscillations describe a perturbed two-dimensional harmonic motion in the complex plane. FIGS. 2a to 2d illustrate four voices—at: f=6 (2a), f=12 (2b), f=19 (2c), and f=25 (2d)—of the full S-spectrum shown in FIG. 1a, plotted parametrically in the complex plane as functions of time. FIGS. 2a to 2d illustrate that the complex position of $S^c(\tau^c, f^c)$ varies more rapidly with $\tau^c$ at larger values of $|f^c|$. From this it is inferred that, at larger values of $|f^c|$, a sparse approximation of $S^c(\tau^c, f^c)$ will need to retain more points in the $\tau^c$ direction to accurately describe the content of $S^c(\tau^c, f^c)$.

From basic multi-rate theory it is well known that it is possible to carry out a time interpolation of a discrete function by padding its DFT spectrum with zeros, and then taking the inverse DFT of the padded spectrum. Conversely, decimation in time is accomplished by: low-pass filtering the summand of equation (2), removing the large-$|\alpha|$ terms, and making a corresponding change in the value of M in the argument of the complex Fourier sinusoid. Here, the "low-pass" filter is the $\exp(-2\pi^2\alpha^2/f^2)$ term. Since it acts on $H(\alpha+f)$ instead of $H(\alpha)$, it is equivalent to a constant-Q band-pass filter applied to H. This gives the time-decimated S-transform, $$S(j, f) = \frac{1}{M} \sum_{\alpha=-|f|/2}^{|f|/2-1} H(\alpha + f) \left\{ \exp\left( \frac{-2\pi^2\alpha^2}{f^2} \right) \right\} \exp\left( \frac{2\pi i \alpha j}{f} \right). \quad (7)$$

This time-decimated S-transform satisfies the above requirement because it retains $|f|$ points in the time direction at each value of $f$. In equation (7), the quantity j is an integer time index. The actual time positions—on the $\tau$ axis—of the elements of the decimated S-transform have the form $jM/|f|$. Not all are integer values. In the example shown in FIG. 1b, the horizontal position of each element has been rounded to the nearest integer for plotting purposes; but in FIGS. 2a to 2d, the entries of the decimated voices are shown—as squares—at their actual positions. Optionally, variations of the above method for decimating the S-transform in time are employed by using, for example, a different low-pass filter function and different limits of the summation.

Figures 3A, 3B:
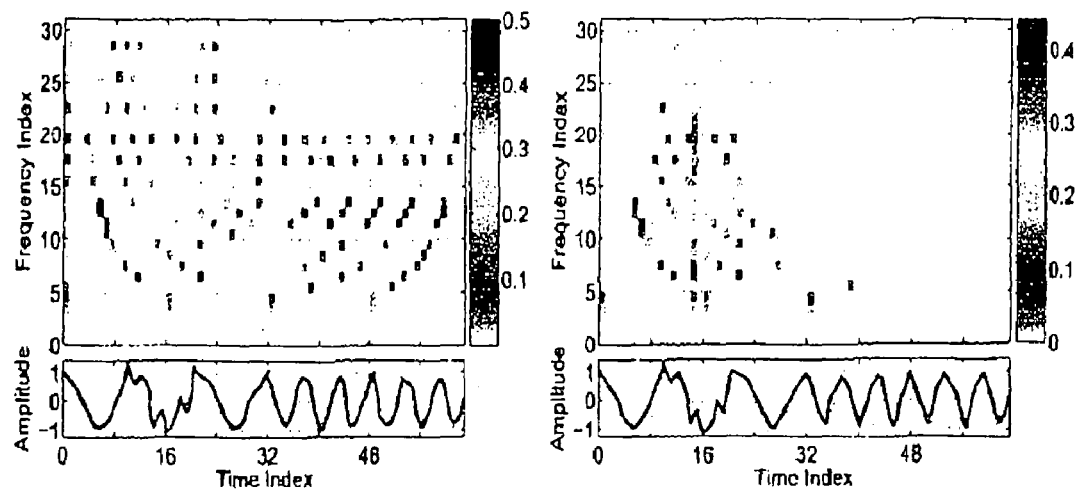
FIG. 3a is a diagram illustrating a sparse S-spectrum of a time series shown in a subplot.
FIG. 3b is a diagram illustrating an approximate local spectrum interpolated from data of the sparse S-spectrum.

Since the resolution of the S-transform varies with $1/|f|$ in the time direction and with $|f|$ in the frequency direction, the situation for decimating the S-transform in frequency is the opposite of the decimation in time: i.e. more voices of $S(\tau,f)$ need to be retained at low $|f|$, and fewer at large $|f|$. The standard deviations of the time and frequency representations of the S-transform window provide useful information for deciding the number of voices to omit. The standard deviation of the time-domain form of the S-transform window of equation (1) is $M/|f|$ pixels. Due to the choice of $\pm|f|/2$ as limits of summation in equation (7), $M/|f|$ is also the time spacing between entries of the sparse S-transform. From this it follows that $|f|/(2\pi)$ pixels—the standard deviation of the Fourier-domain form of the S-transform window shown in equation (2)—provides appropriate frequency spacing. In practice, this spacing is determined as an integer value, which is obtained by rounding down $|f|/(2\pi)$ and adding 1 if the result is 0. Thus, all of the lowest frequencies are retained, but once |ƒ| is greater than 4π some harmonics are omitted. FIG. 3a illustrates the sparse S-spectrum after application of the above decimation in time and frequency.

For longer time series and large images, decimation across frequencies saves a substantial amount of calculation time and memory storage. For example, when M=5000, only approximately every $400^{th}$ voice is retained upon reaching of the Nyquist frequency. The probability that a particular $(\tau,f)$ pixel of the full S-transform contains an entry of the sparse approximation is approximately $(f/M)(2\pi/f)=2\pi/M$. With the full S-transform containing $M^2/2$ complex entries, the number of complex entries of the sparse S-transform is determined to be approximately $\pi M$. Therefore, the sparse approximation of the S-transform requires substantially less memory storage than the full S-transform. Calculation of each voice of the sparse approximation requires approximately $5f\log_2(f)$ operations, thus, the total number of operations is approximately $5\pi M \log_2(M)$ for large M. This is only $2\pi$ times the number of operations needed to obtain the DFT of the time series.

Each local spectrum of the sparse S-transform shown in FIG. 3a contains only a few entries, with most of the entries not coinciding in their locations with respect to the time axis. This is also the case for two-dimensional local spectra of the sparse S-transform of images. Therefore, a two-stage interpolation procedure—time and frequency—is implemented to interpolate the entries of the sparse S-transform for determining local spectra. For example, in the one-dimensional case a value of $\tau$ is selected—denoted $\tau_0$—for which an approximate local spectrum is to be determined. At each value of ƒ for which the sparse S-transform contains nonzero entries, the four nonzero entries for which $\tau M/|f|$ is closest to $\tau_0$ are selected and interpolated using cubic polynomial interpolation in order to obtain the approximate value at $\tau_0$. When |ƒ|<4, the time periodicity of the S-transform is invoked to give four points in the time direction, or alternatively the number of time points retained is increased from |ƒ| to 4; it is of course possible to implement various other interpolation procedures, with the minimum number of points retained in the sparse S-transform adjusted accordingly. At any value of ƒ, if $\tau_0$ is located close to the beginning or end of the time series, the time periodicity of the S-transform is used in the interpolation procedure. In the second stage, the full local spectrum at $\tau_0$ is determined by interpolating the points obtained in the first stage using, for example, a cubic spline interpolation. To ensure, that the spline interpolation is accurate near the Nyquist frequency (the frequency for which |ƒ|=M/2), one or two frequency values above |ƒ|=M/2 are included in the sparse S-transform. An example of an approximate local spectrum at $\tau_0=14$—filled column—is shown in FIG. 3b, together with the points used in its calculation.

Figures 3C, 3D:
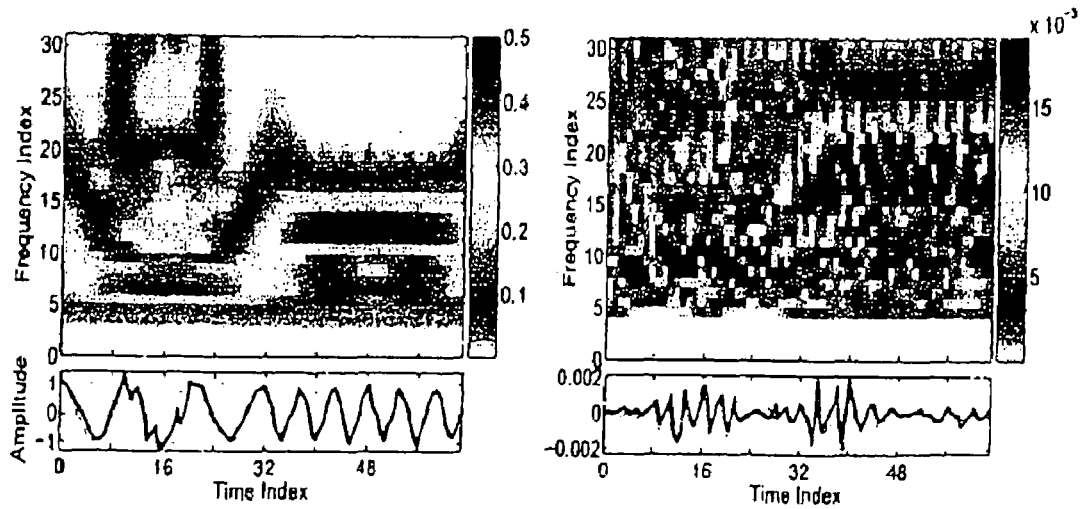
FIG. 3c is a diagram illustrating an approximate S-spectrum interpolated from the sparse S-spectrum and a reconstructed time series, shown in a subplot.
FIG. 3d is a diagram illustrating the error of the approximate S-spectrum and the reconstructed time series, shown in a subplot.

Using the above interpolation procedure, an entire approximate S-spectrum is re-interpolated, one local spectrum at a time. The result is then substituted in place of $S(\tau,f)$ in equation (8) for reconstructing an approximation of the original time series h(t), as shown in FIG. 3c. FIG. 3d shows the error of the results in FIG. 3c, as compared with the original time series h(t) and its full S-transform $S(\tau,f)$, shown in FIG. 1a. The relatively small errors in the reconstructed time series provide a good indicator of the reliability of the approximation of the sparse S-transform and the interpolation procedure.

Figure 4A:
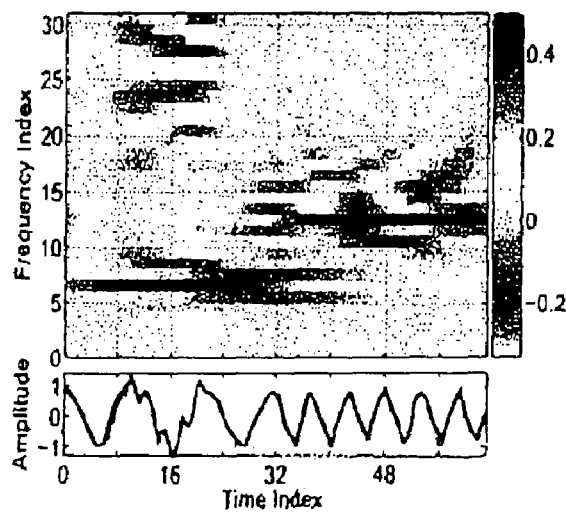
Figure 4B:
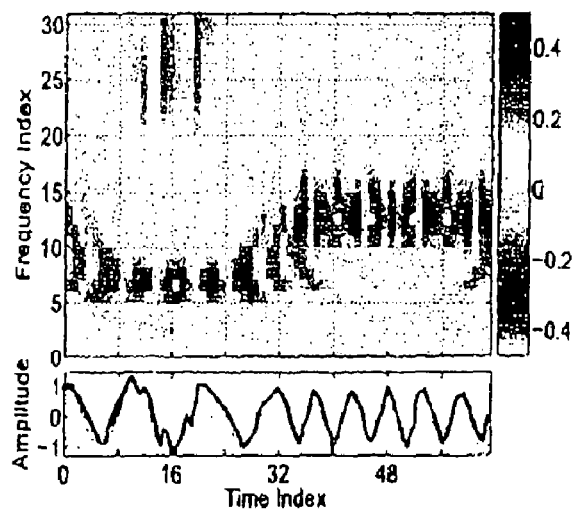
FIG. 4b is a diagram illustrating the real part of the full S-spectrum shown in FIG. 1a after frequency adjustment.

In the second stage of the interpolation procedure, phase adjustment of the sparse S-transform is performed before and after the spline interpolation. Referring to FIG. 4a, the real part $\Re\{S(\tau,f)\}$ of the S-transform associated with FIG. 1a is depicted. FIG. 4a shows that $\Re\{S(\tau,f)\}$ varies much more rapidly in the ƒ direction than the τ direction. Thus the vertical smearing of the S-spectrum |S(τ,ƒ)| shown in FIG. 1a gives a misleading impression of the rapid variation of the real and imaginary parts of $S(\tau,f)$ in the ƒ direction. Unless the real and imaginary parts of $S(\tau,f)$ are interpolated separately, phase information will be lost. This is overcome by multiplying $S(\tau,f)$ with $\exp(2\pi if\tau)$ after the time interpolation stage. The real part of $\exp(2\pi if\pi)S(\tau,f)$ is shown in FIG. 4b. FIG. 4b shows that the real and imaginary parts of this phase adjusted S-transform vary slowly in the frequency direction. Therefore, it is now possible to perform spline interpolation in the frequency direction, after which the result is multiplied by $\exp(-2\pi if\tau)$ to return the phase to its original value. This technique was used to produce the results shown in FIGS. 3b to 3d.

Figure 5A:
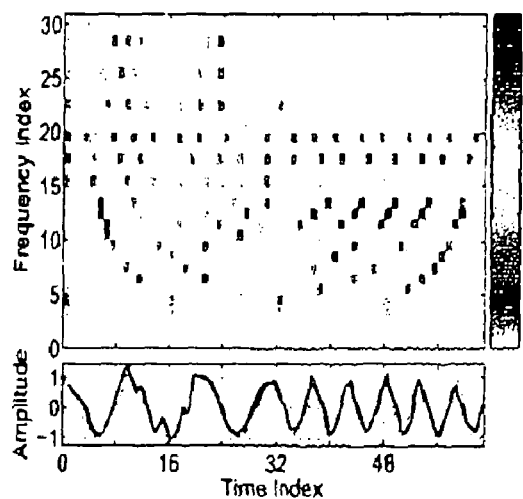
FIG. 5a is a diagram illustrating a sparse S-spectrum of a time series shown in a subplot.
Figure 5B:
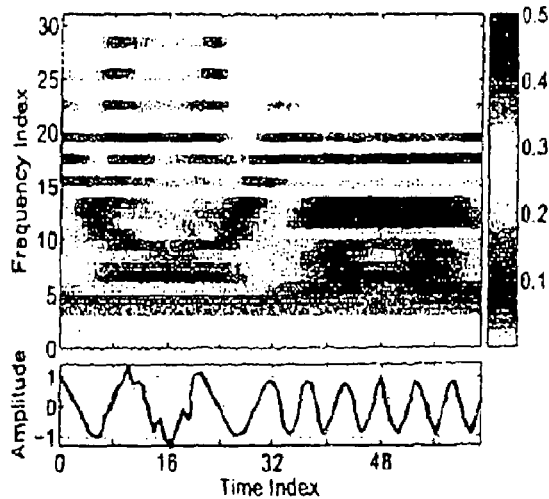
FIG. 5b is a diagram illustrating voices interpolated from data of the sparse S-spectrum.
Figure 5C:
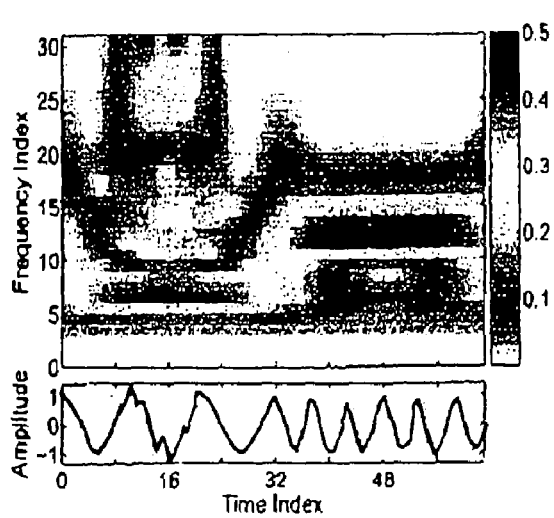
FIG. 5c is a diagram illustrating an approximate S-spectrum interpolated from the sparse S-spectrum and a reconstructed time series, shown in a subplot.
Figure 5D:
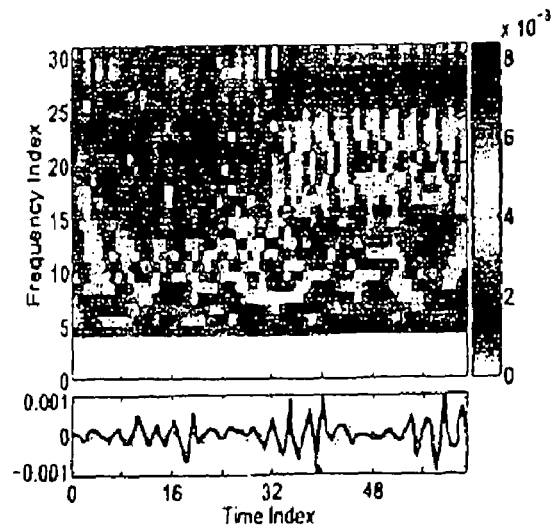
FIG. 5d is a diagram illustrating the error of the approximate S-spectrum and the reconstructed time series, shown in a subplot.

In an alternative interpolation procedure, time interpolated voices are determined using cubic splines fitted to each voice and periodic boundary conditions. FIG. 5b shows a row-by row cubic spline interpolation of the sparse S-transform of the time series shown in FIG. 5a, producing time interpolated voices. Column-by-column spline interpolation of the voices produces an entire approximated S-spectrum, which is then substituted in place of $S(\tau,f)$ in equation (8) for reconstructing an approximation of the original time series h(t), as shown in FIG. 5c. FIG. 5d shows the error of the results in FIG. 5c, as compared with the original time series h(t) and its full S-transform $S(\tau,f)$, shown in FIG. 1a. As above, the relatively small errors in the reconstructed time series provide a good indicator of the reliability of the approximation of the sparse S-transform and the interpolation procedure.

The determination of the entire approximated S-spectrum as shown in FIGS. 3c and 5c has been performed in order to obtain an indication of the reliability of the approximation of the sparse S-transform and the interpolation procedures. In practice, the determination of an entire approximated S-spectrum requires the same amount of computer memory storage as the corresponding full S-transform, takes more computing time to calculate, and introduces error into the result.

However, determining entire approximate S-spectra has important applications to time-frequency filtering of a time series signal. In the full one-dimensional S-transform, time-frequency filtering is possible because summing equation (2) over all τ produces H(ƒ), the DFT of the time series h(t), $$H(f) = \sum_{\tau=0}^{M-1} S(\tau, f). \tag{8}$$

To perform time-frequency filtering, by analogy with Fourier-domain filtering equation (8) is modified to $$H_F(f) = \sum_{\tau=0}^{N-1} S(\tau, f) F(\tau, f), \tag{9}$$

where F(τ,ƒ) is a time-frequency filter function. The inverse DFT of $H_F(f)$ then provides a filtered time series $h_F(t)$.

Since the full S-transform requires significant resources to calculate and store, it is desirable to find an analogous technique by which the sparse S-transform is inverted, to make time-frequency filtering practical. Suppose that the sparse approximation of $S(\tau,f)$ shown in FIG. 5a is denoted by $\hat{S}(j,f^l)$, where $f^l$ are V frequencies whose voices contain non-zero elements (l=0, ..., V−1). Each voice of $\hat{S}(j,f^l)$ has entries at $jM/|f^l|$ on the time axis of the time series h(t), where j=0, ..., $f^l$−1. If the re-interpolated S-transform shown in FIG. 5c is denoted $\tilde{S}(\tau,f)$, the decimation and re-interpolation procedures are represented as follows:

$$S(\tau, f) \xrightarrow{D} \hat{S}(j, f^l), \quad (10)$$
$$\hat{S}(j, f^l) \xrightarrow{I} \tilde{S}(\tau, f),$$

where $$\xrightarrow{D}$$

denotes decimation, and $$\xrightarrow{I}$$

denotes re-interpolation.

Next, $\hat{S}(j,f^l)$ is expressed as a linear combination of sparse time-frequency distributions, denoted $\hat{S}_{j'l'}(j,f^l)$, with each being equal to 1 at $(j',f^{l'})$ and equal to 0 at all other $(j,f^l)$. Thus $\hat{S}_{j'l'}(j,f^l) = \delta_{jj'}\delta_{ll'}$, where $\delta$ is the Kronecker delta, and giving $$\hat{S}(j, f^l) = \sum_{l'=0}^{V-1} \sum_{j'=0}^{f^{l'}-1} \hat{S}(j', f^{l'})\delta_{jj'}\delta_{ll'}, \quad (11)$$
$$= \sum_{l'=0}^{V-1} \sum_{j'=0}^{f^{l'}-1} \hat{S}(j', f^{l'})\hat{S}_{j'l'}(j, f^l).$$

The same interpolation procedure used in equation (10) is then applied to each of the $\hat{S}_{j'l'}(j,f^l)$, to produce approximations on the full $(\tau,f)$ plane, denoted $S_{j'l'}(\tau,f)$, $$\hat{S}_{j'l'}(j, f^l) \xrightarrow{I} S_{j'l'}(\tau, f). \quad (12)$$

Since the interpolation procedure is linear, i.e. for a particular set of $(j,f^l)$, $$\text{if} \quad \hat{A}(j, f^l) \xrightarrow{I} \tilde{A}(\tau, f) \text{ and } \hat{B}(j, f^l) \xrightarrow{I} \tilde{B}(\tau, f), \quad (13)$$
$$\text{then} \quad \hat{A}(j, f^l) + \hat{B}(j, f^l) \xrightarrow{I} \tilde{A}(\tau, f) + \tilde{B}(\tau, f),$$

where $\hat{A}$, $\hat{B}$, $\tilde{A}$, and $\tilde{B}$ are time-frequency distributions whose subscripts follow the same nomenclature as those of $\hat{S}$ and $S$. then equations (10) to (13) give an expression of $\tilde{S}(\tau,f)$ in terms of $S_{j'l'}(\tau,f)$:

$$\tilde{S}(\tau, f) = \sum_{l'=0}^{V-1} \sum_{j'=0}^{f^{l'}-1} \hat{S}(j', f^{l'})\tilde{S}_{j'l'}(\tau, f). \quad (14)$$

The terms $S_{j'l'}(\tau,f)$ are basis functions for the re-interpolated S-transform with each one being associated with an amplitude at a corresponding $(j^1,f^{l'})$ point in the sparse S-transform.

Since $S(\tau,f)$ requires as much memory storage as the full S-transform, it is desired to invert $\hat{S}(j,f^{l'})$ without calculating $S(\tau,f)$. By analogy with equation (8), it is possible to define an inverse operation for $\hat{S}(j,f^{l'})$ through use of $S(\tau,f)$ and expression (14):

$$\tilde{H}(f) = \sum_{\tau=0}^{N-1} \tilde{S}(\tau, f) = \sum_{l'=0}^{V-1} \sum_{j'=0}^{f^{l'}-1} \hat{S}(j', f^{l'}) \sum_{\tau=0}^{N-1} \tilde{S}_{j'l'}(\tau, f), \quad (15)$$

$$\therefore \tilde{H}(f) = \sum_{l'=0}^{V-1} \sum_{j'=0}^{f^{l'}-1} \hat{S}(j', f^{l'})\tilde{H}_{j'l'}(f).$$

Here $\tilde{H}(f)$ is the DFT of $\tilde{h}(t)$, the approximation of the time series h(t)—as shown in the subplots of FIGS. 3c and 5c. The term $\tilde{H}_{j'l'}(f)$ describes a unit contribution of the $(j',f^{l'})$ point in the sparse S-transform to the complete Fourier transform. Its inverse DFT, denoted $\tilde{h}_{j'l'}(t)$, gives the contribution of the $(j',f^{l'})$ point to the time series. Collectively, the $\tilde{h}_{j'l'}(t)$ terms form a set of nonorthogonal time-domain basis functions known as a frame in the mathematical literature. The inverse of the sparse S-transform is then:

$$\tilde{h}(t) = \sum_{l'=0}^{V-1} \sum_{j'=0}^{f^{l'}-1} \hat{S}(j', f^{l'})\tilde{h}_{j'l'}(t). \quad (16)$$

Figure 6:
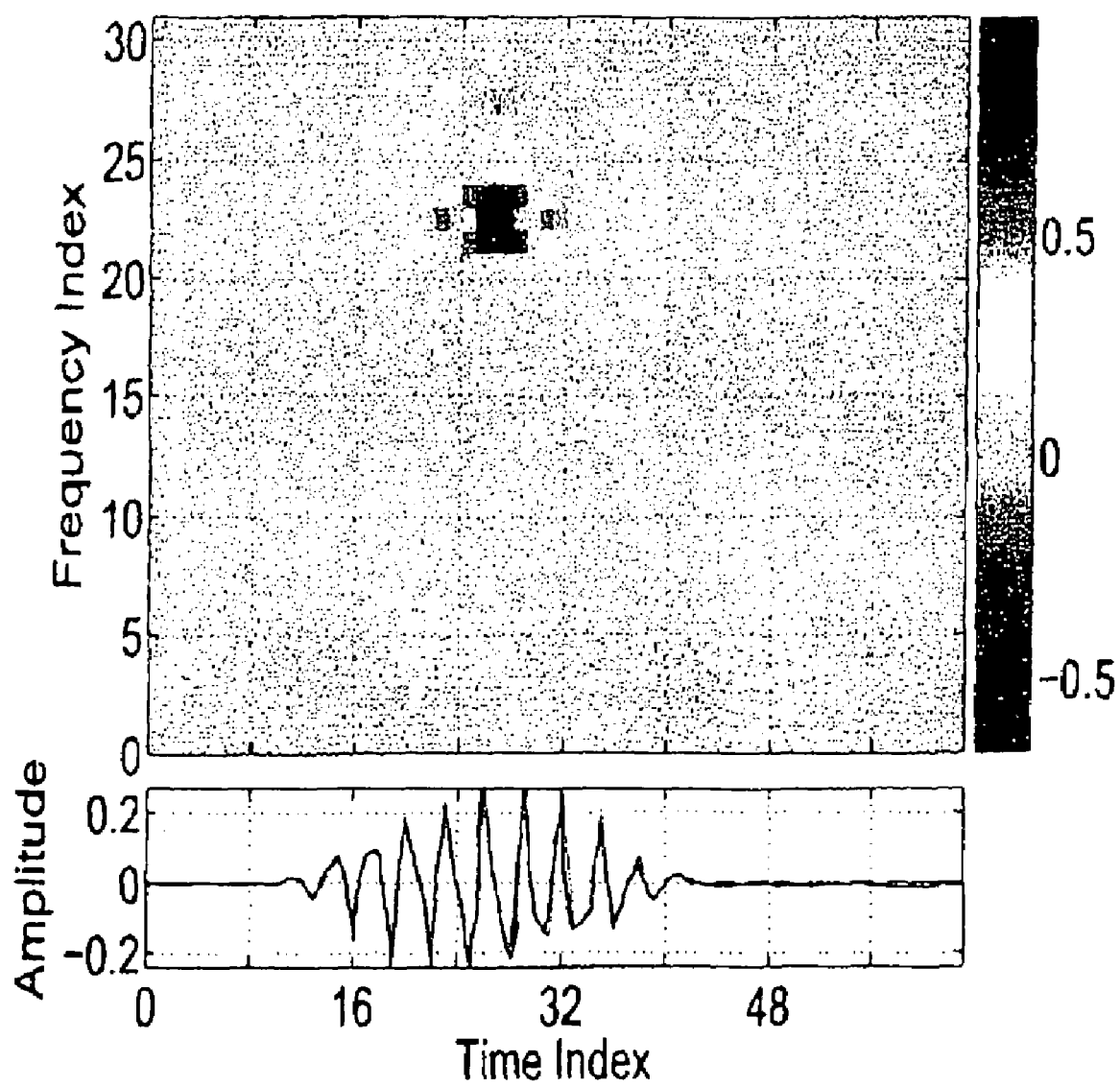
FIG. 6 is a diagram illustrating one of the interpolated $S_{j,\eta}(\tau,f)$ basis functions and the corresponding time domain basis function.

FIG. 6 shows one of the interpolated $S_{j'l'}(\tau,f)$ basis functions, obtained by setting $\hat{S}_{j'l'}(j,f^l) = \delta_{jj'}\delta_{ll'}$ for a particular $(j',l')$ and then applying the same interpolation procedure used to produce the approximate S-spectrum in FIG. 5c, and the associated time domain basis function $\tilde{h}_{j'l'}(t)$.

The disadvantage of the above process is that significant calculations are required to obtain all the time domain basis functions $\tilde{h}_{j'l'}(t)$ by performing full spline interpolations of all the $\hat{S}_{j'l'}(j,f^l)$, since the number of $\hat{S}_{j'l'}(j,f^l)$ distributions is approximately πM. Fortunately it is possible to reduce the calculations. Suppose that a particular term $\hat{S}_{j'l'}(j,f^l)$ is selected and the interpolation procedure is applied. Since the interpolations across time and frequency are separate, it is possible to express the result as a phase-shifted product of interpolated time and frequency functions:

$$\hat{S}_{j'l'}(j, f^l) \xrightarrow{I} \exp\left[\frac{-2\pi i(f - f^{l'})\tau}{M}\right] c_{j'l'}(\tau)d_{l'}(f). \quad (17)$$

Here, $c_{j'l'}(\tau)$ is the time function initially obtained from the interpolation of $\hat{S}_{j'l'}(j,f^l)$ across time, and $d_{l'}(f)$ is the function obtained by interpolating a unit impulse at $f^{l'}$ across frequency, according to the above interpolation procedures. From equation (15) follows $$\tilde{H}_{j'l'}(f) = d_{l'}(f) \sum_{\tau=0}^{N-1} \exp\left[\frac{-2\pi i(f-f^{l'})\tau}{M}\right] c_{j'l'}(\tau), \quad (18)$$

$$= d_{l'}(f) C_{j'l'}(f - f^{l'}),$$

where $C_{j'l'}(f)$ is the DFT of $c_{j'l'}(\tau)$. Further, for any particular l', the continuous-domain equivalents of the $c_{j'l'}(\tau)$ functions are time shifted versions of each other, such that:

$$c_{j'l'} = c_{0l'}\left(\tau - \frac{j'M}{f^{l'}}\right). \quad (19)$$

Since time shifting is equivalent to a phase ramp in the Fourier domain, equation (18) becomes:

$$\tilde{H}_{j'l'}(f) \approx d_{l'}(f) C_{0l'}(f - f^{l'}) \exp\left(\frac{-2\pi i f j'}{f^{l'}}\right). \quad (20)$$

For large and/or multidimensional signals, equation (20) leads to substantial calculation savings because it is possible to obtain all of the $H_{j'l'}$ terms once $H_{0l'}$ is known. This reduces the number of full interpolations from ~πM to ~2πlog M. The approximation sign in equation (20) occurs because—in equation (19)—j'M/$f^{l'}$ is not always an integer. However, the error introduced here does not significantly increase the overall error. From substituting equation (20) into equation (14) we get:

$$\tilde{H}(f) \approx \sum_{l'=0}^{V-1} \tilde{H}_{l'}(f) \sum_{j'=0}^{f^{l'}-1} \hat{S}(j', f^{l'}) \exp\left(\frac{-2\pi i f j'}{f^{l'}}\right), \quad (21)$$

with $H_{0l'}(f)$ now referred to as $H_{l'}(f)$. The inverse DFT of equation (21) gives an approximation of h̃(t). Expression (21) further accelerates the computation of the inverse sparse S-transform, because the sum over j' is a DFT.

By analogy, it is possible to construct a sparse equivalent of F(τ,f), denoted F(j,$f^l$), and to modify equation (21) to give $$\tilde{H}_F(f) \approx \sum_{l'=0}^{V-1} \tilde{H}_{l'}(f) \sum_{j'=0}^{f^{l'}-1} \hat{F}(j', f^{l'}) \hat{S}(j', f^{l'}) \exp\left(\frac{-2\pi i f j'}{f^{l'}}\right), \quad (22)$$

where $H_F(f)$ is the filtered version of $H(f)$, from which a filtered approximate time series h̃$_F$(t) is obtained. In the case of a gather of several different time series that all have the same number of sample points—such as a seismic shot gather—it is possible to use the same set of $H_{l'}(f)$ functions to filter each time series, with a different filter being used each time if desired.

The simplest method of determining a two-dimensional sparse S-transform of an M×N image h(x,y), where x and y denote integer spatial indices, is to extend equation (7) to two dimensions using a composite two-dimensional Gaussian window:

$$^2\hat{S}(j,k,f^l,g^l) = \frac{1}{MN} \sum_{\alpha=-|f^l|/2}^{|f^l|/2-1} \sum_{\beta=-|g^l|/2}^{|g^l|/2-1} H(\alpha+f^l, \beta+g^l) \times \quad (23)$$

$$\left\{\exp\left(\frac{-2\pi^2\alpha^2}{(f^l)^2}\right)\exp\left(\frac{-2\pi^2\beta^2}{(g^l)^2}\right)\right\} \times \exp\left(\frac{2\pi i \alpha j}{f^l}\right)\exp\left(\frac{2\pi i \beta k}{g^l}\right).$$

Figure 7A:
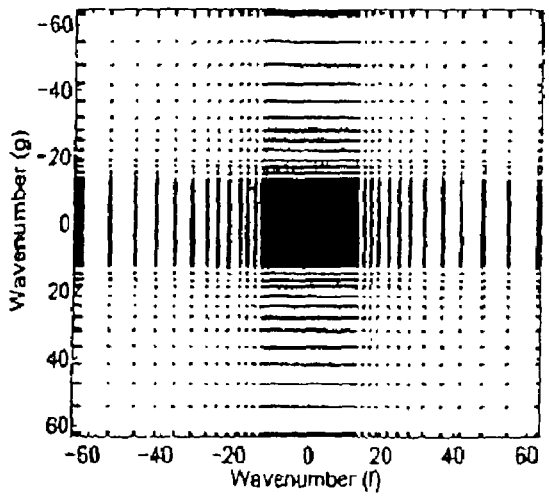
FIG. 7a is a diagram illustrating a Cartesian matrix of $(f^l, g^l)$ wave-vectors used in a two dimensional sparse S-transform.

Here, $f^l$ and $g^l$ are integer wave-vector component indices, and j and k are integer position indices. As in the one-dimensional case, the ($f^l$,$g^l$) are the only wave-vectors for which the S-transform has nonzero entries, with l=0, . . . , V−1. In the spatial domain, the composite window—term in braces—used in equation (23) is the product of separate Gaussians in the x- and y-directions. Both have the same functional form as the window used in equation (1) and consequently the wave-vector indices $f^l$ and $g^l$ have a same set of possible values. Therefore, the ($f^l$,$g^l$) wave-vectors form a Cartesian grid as shown in FIG. 7a. At any particular ($f^l$,$g^l$) wave-vector, the entries of $^2$S are located at (X,Y)=(jM/$f^l$,kN/$g^l$) on the (x,y) axes, where x=0, . . . , M−1 and y=0, . . . , N−1. The techniques outlined above for the one-dimensional case are applied in a similar fashion yielding an inverse process for $^2\hat{S}$:

$$\tilde{H}(f,g) \approx \sum_{l'=0}^{V-1} \tilde{H}_{l'}(f,g) \sum_{j'=0}^{f^{l'}-1} \sum_{k'=0}^{g^{l'}-1} {}^2\hat{S}(j', k', f^{l'}, g^{l'}) \times \quad (24)$$

$$\exp\left(\frac{-2\pi i f j'}{f^{l'}}\right)\exp\left(\frac{-2\pi i g k'}{g^{l'}}\right),$$

where $H_{l'}(f,g)$ is defined similarly to equation (20):

$$\tilde{H}_{l'}(f,g) \approx d_{l'}(f,g) C_{l'}(f-f^{l'},g-g^{l'}). \quad (25)$$

The definitions of $d_{l'}(f,g)$ and $C_{l'}(f-f^{l'},g-g^{l'})$ are analogous to the ones of $d_{l'}(f)$ and $C_{0l'}(f-f^{l'})$ from expression (20). The two-dimensional versions of d and C are obtained by interpolating unit impulses on the ($f^{l'}$,$g^{l'}$) and (j,k) grids to give functions on the (f,g) and (X,Y) grids.

By extension of this reasoning, it is possible to define sparse S-transforms of data that have three or more dimensions, such as 3-D seismic data. The full S-transforms of multidimensional data arrays have enormous size, and it is likely that space-local frequency analysis of the type described above will, for the foreseeable future, only be possible through use of these sparse approximations.

Alternatively, the two-dimensional sparse S-transform $^2\hat{S}$ is determined using the "polar" form of the S-transform, whose full, discrete, form is:

$$^2S_P(X,Y,f,g) = \frac{1}{MN} \sum_{\alpha=-M/2}^{M/2-1} \sum_{\beta=-N/2}^{N/2-1} H(\alpha+f, \beta+g) \times \quad (26)$$

$$\left\{\exp\left(\frac{-2\pi^2(\alpha^2/M^2 + \beta^2/N^2)}{f^2/M^2 + g^2/N^2}\right)\right\} \times$$

$$\exp\left(\frac{2\pi i \alpha X}{M}\right)\exp\left(\frac{2\pi i \beta Y}{N}\right).$$

Figure 7B:
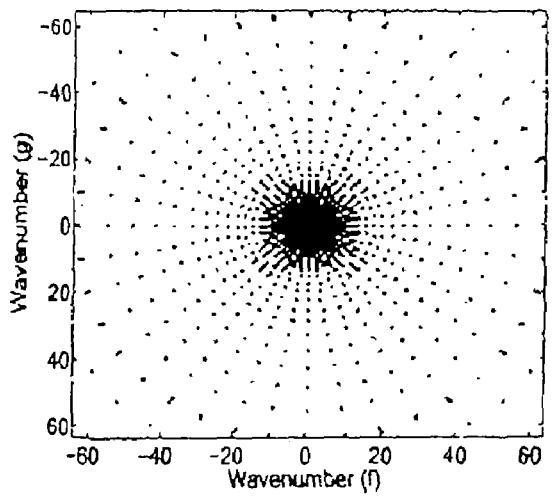
FIG. 7b is a diagram illustrating a Polar matrix of $(f^l, g^l)$ wave-vectors used in a two dimensional sparse S-transform.

In equation (26), the window function—the term in braces—is a circularly symmetrical Gaussian in the spatial domain. Vertical cross sections through its peak have standard deviations equal to $\sqrt{f^2+g^2}$. Using the above decimation procedure leads to the following sparse approximation in polar form ${}^2\hat{S}_P$:

$$
{}^2\hat{S}_P(j, k, f^l, g^l) = \frac{1}{MN} \sum_{\alpha=-J(f^l,g^l)/2}^{J(f^l,g^l)/2-1} \sum_{\beta=-K(f^l,g^l)/2}^{K(f^l,g^l)/2-1} H(\alpha + f, \beta + g) \times \\
\left\{ \exp\left( \frac{-2\pi^2(\alpha^2/M^2 + \beta^2/N^2)}{f^2/M^2 + g^2/N^2} \right) \right\} \times \\
\exp\left( \frac{2\pi i \alpha j}{J(f^l, g^l)} \right) \exp\left( \frac{2\pi i \beta k}{K(f^l, g^l)} \right),
\tag{27}
$$

where $J(f^l,g^l)=K(f^l,g^l)=\text{ceil}(\sqrt{(f^l)^2+(g^l)^2})$. For a given $(f^l,g^l)$ wave-vector, the actual position of the point (j,k) on the (X,Y) axis is $(jM/J(f^l,g^l), kN/K(f^l,g^l))$. In the frequency domain, the standard deviation of the window function in the g—direction is equal—to within a constant—to its standard deviation in the $f$—direction at all $(f,g)$. This situation is different from that of the composite window of equation (23), for which the $f$- and g-tapers are independent of each other at any particular $(f^l,g^l)$. Since the spacing between retained $(f^l,g^l)$ wavevectors depends on the $f$- and g-tapers, a polar grid of $(f^l,g^l)$ wave-vectors is more appropriate here than a Cartesian grid, although it is possible to use the Cartesian grid. The $f$ values from the frequency decimation above are used to obtain the radius of each "ring" of polar values, and the angular spacing between points in each ring is π/20 radians, as shown in FIG. 7b. It is noted that rounding is necessary since $f$ and g are represented as integer values. If M≠N, the rings are stretched into ellipses with a corresponding non-regularity in angular spacing. Regardless of the wave-vector grid—rings or ellipses—used, interpolation of impulses over the (j,k) and $(f^l,g^l)$ axes leads to a new set of $H_l(f,g)$ functions that invert to $H(f,g)$ through the modified relation:

$$
\tilde{H}(f, g) \approx \sum_{l'=0}^{V-1} \tilde{H}_l(f, g) \sum_{j'=0}^{L(f^{l'},g^{l'})-1} \sum_{k'=0}^{L(f^{l'},g^{l'})-1} \hat{S}(j', k', f^{l'}, g^{l'}) \times \\
\exp\left( \frac{-2\pi i (f - f^{l'}) j'}{J(f^l, g^l)} \right) \exp\left( \frac{-2\pi i (g - g^{l'}) k'}{K(f^l, g^l)} \right).
\tag{28}
$$

Figure 7C:
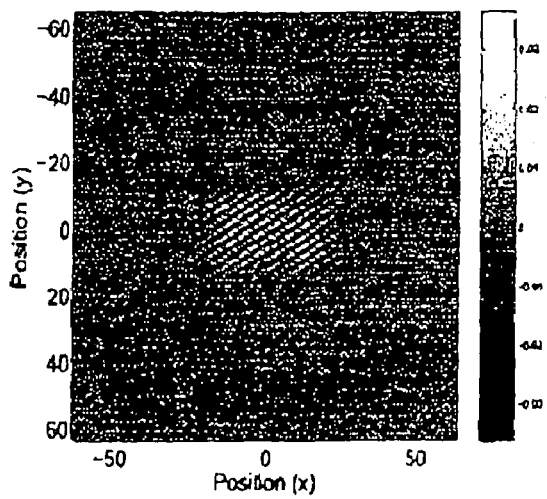
Figure 7D:
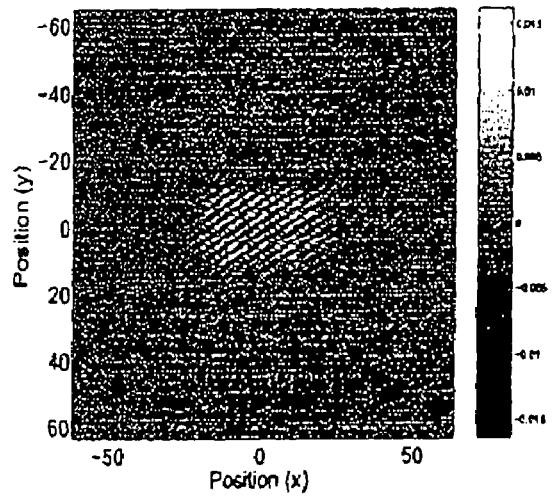

The main difference between equations (28) and (24) is that the DFT given by the sums over j' and k' are shifted on the $(f,g)$ axes. This type of approach can also be applied to the one-dimensional case shown in equation (21) if the desired number of time points at a particular frequency is different from $|f|$. As before, the inverse DFT of each $H_{l'}$ gives a spatial—domain $\tilde{h}_{l'}$ basis function. FIGS. 7c and 7d show the composite-window and polar-window spatial—domain $\tilde{h}_{l'}$ basis functions associated with the (42, 25) wave-vector in the Cartesian matrix shown in FIG. 7a.

Figure 8A:
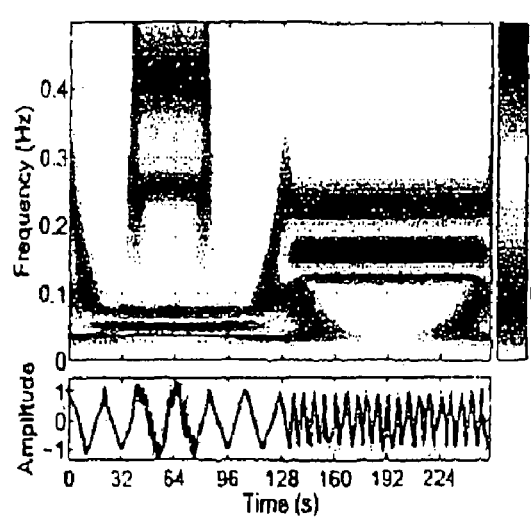
FIG. 8a is a diagram illustrating a full S-spectrum of a 256-point time series shown in a subplot.
Figure 8B:
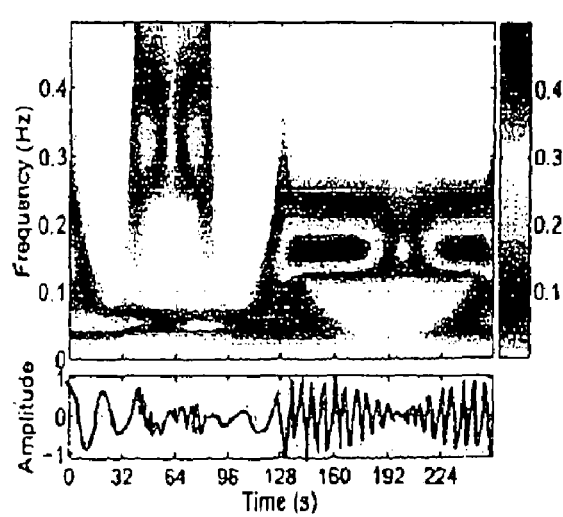
FIG. 8b is a diagram illustrating the full S-spectrum shown in FIG. 8a after filtering and the corresponding filtered time series.
Figure 9A:
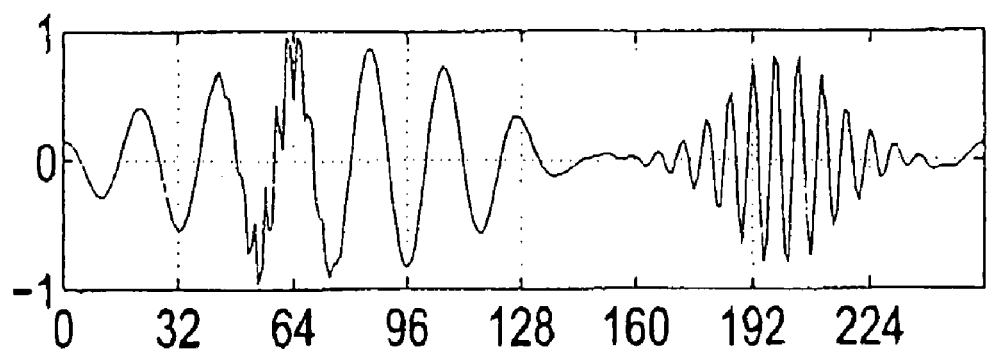
FIG. 9a is a diagram illustrating the portion of the time series removed by the filtering using the full S-transform shown in FIG. 8b.
Figure 9B:
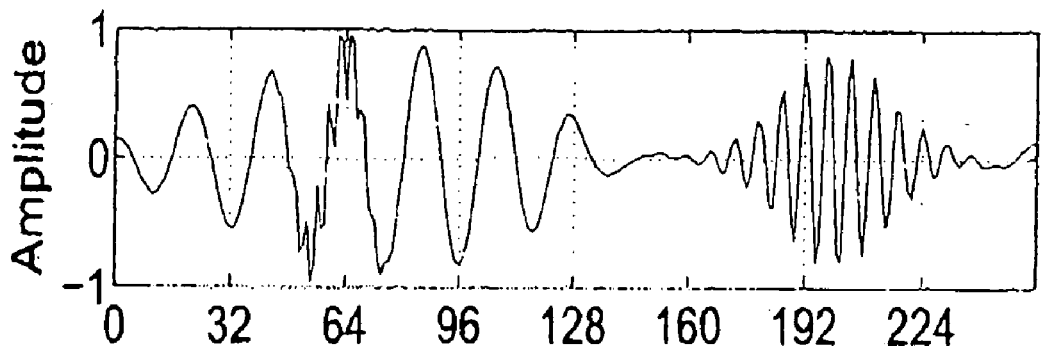
FIG. 9b is a diagram illustrating the portion of the time series removed by filtering using a sparse S-transform.
Figure 9C:
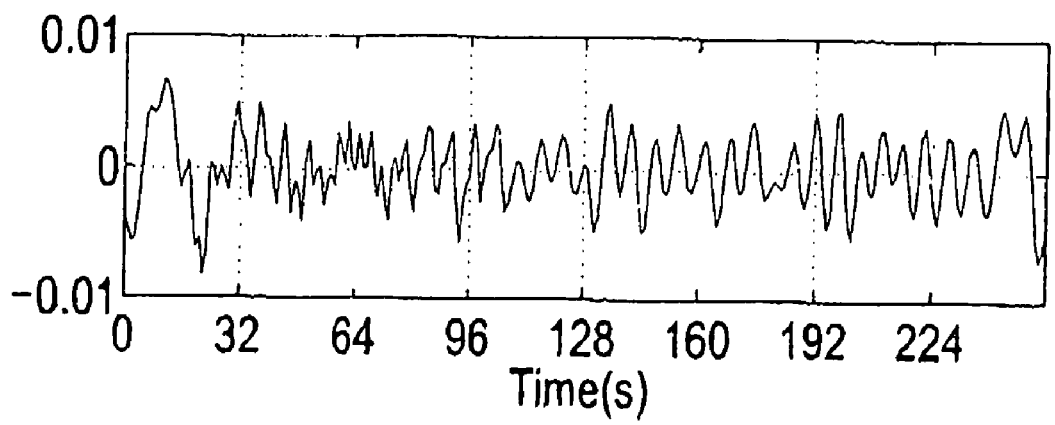
FIG. 9c is a diagram illustrating the difference between the diagrams shown in FIGS. 9a and 9b (note the change in the amplitude scale)

FIG. 8a shows a 256—point synthetic time series and its full S-spectrum as obtained from equation (2). In FIG. 8b, three spot filters have been applied to this S-spectrum to give a filtered time series. Each spot filter is centered around a particular $(\tau_0, f_0)$ and is based on the time- and frequency-domain expressions of the S-transform window function, having the form $$
F(\tau, f) = 1 - \exp\left\{ \left[ \frac{-f^2(\tau - \tau_0)^2}{2} - 2\pi^2\left(1 - \frac{f_0}{f}\right)^2 \right] / 4 \right\},
\tag{29}
$$

where $(\tau, f_0)=(12, 80), (80, 60)$, and $(40, 200)$ successively. The product of these has also been applied to the sparse approximation of the S-transform, with $f$ and τ replaced with $f^l$ and $jM/|f^l|$ in equation (29). FIG. 9a shows the difference $h(t)-h_F(t)$, i.e. the portion of the time series that has been removed by applying the filter to the full S-transform of the time series h(t), while FIG. 9b shows the difference $\tilde{h}(t)-\tilde{h}_F(t)$ that is obtained by applying the same filter to the sparse approximation of its S-transform. The diagrams shown in FIGS. 9a and 9b are nearly identical. FIG. 9c shows the relatively small error introduced by the various approximations used in calculating the sparse S-transform and its inverse. Calculating the filtered time series using the sparse approximation of the S-transform—FIG. 9b—takes less than one fifth of the calculation time needed using the full S-transform—FIG. 9a, i.e. 0.51 seconds compared to 2.77 seconds on an Apple Macintosh G4. As N increases, the time saving increases rapidly. For example, for N=1024, filtering of the sparse S-transform takes 1.2 seconds, while filtering of the full S-transform takes 85 seconds; for N=2048, the corresponding calculation times are 1.5 seconds, compared to 543 seconds.

Figures 10A, 10B:
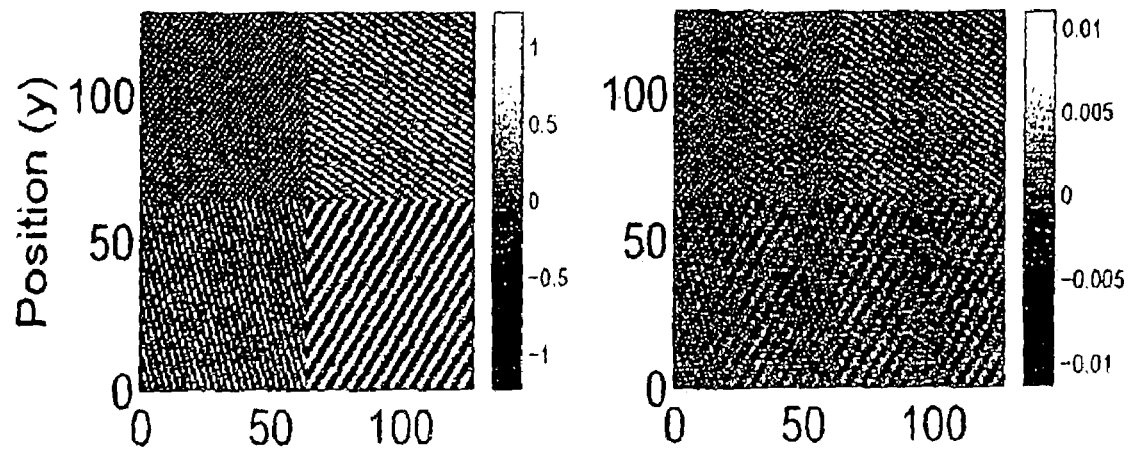
Figures 10C, 10D:
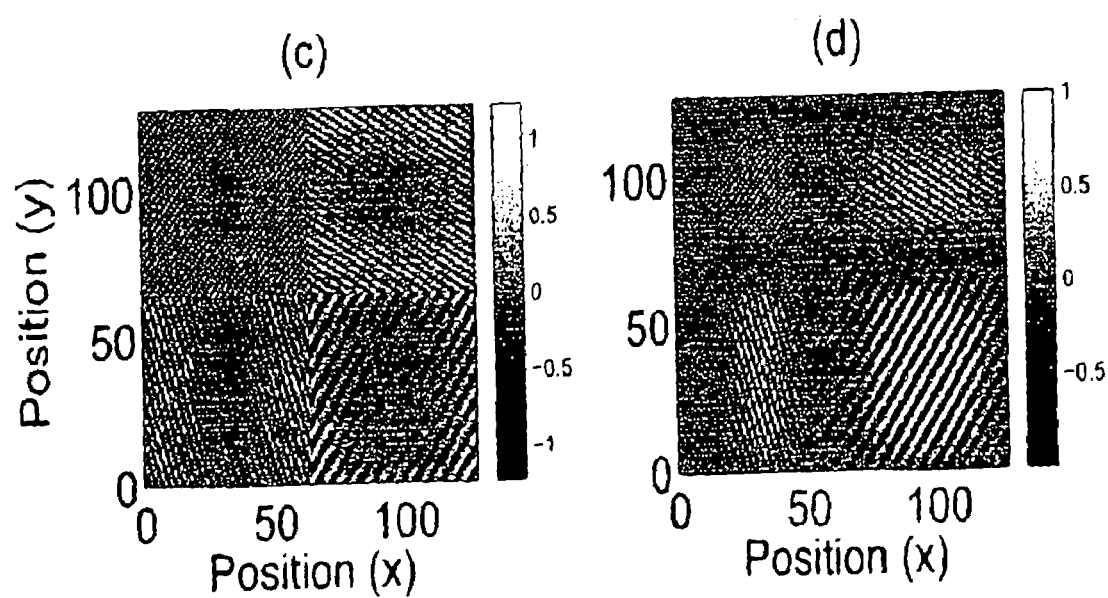

FIG. 10a shows a 128×128 synthetic image whose quadrants contain different two-dimensional cosines. FIG. 10b shows the result of reconstructing the image from the sparse ${}^2\hat{S}$-transform of the image shown in FIG. 10a, clearly illustrating the reliability of the approximation and reconstruction process, whose error is relatively small, about 1%. FIG. 10c shows a filtered image obtained by applying four space-wavevector, or spot, filters to the image data shown in FIG. 10a. The four spacewavevector filters have the general form:

$$
F(X, Y, f, g) = 1 - \exp\left\{ -\left[ \frac{f^4(X - X_0)^4}{2 \cdot 4^4 M^4} + \frac{g^4(Y - Y_0)^4}{2 \cdot 4^4 N^4} \right] - \frac{\pi^4}{4}\left[ \left(1 - \frac{f_0}{f}\right)^4 + \left(1 - \frac{g_0}{g}\right)^4 \right] \right\},
\tag{30}
$$

where $(X_0, Y_0, f_0, g_0)$ indicates the midpoint of the filter in 4-space. These filters are similar to the one defined in equation (29) except that larger exponents have been used in the argument of the exponential. This has been done because the filter of equation (29) has a Gaussianoid shape and, therefore, does not have a "flat" region near the midpoint $(X_0, Y_0, f_0, g_0)$ where it is possible to exclude most of the signal data. Filters of this type—equation (30)—give filtered regions whose shapes are more rectangular on the (x,y) plane than a two-dimensional composite Gaussian filter. The four spot filters have values of $(X_0, Y_0)$ that correspond to the centre of each quadrant, and values of $(f_0, g_0)$ that are given by the $(f,g)$ wave-numbers of the corresponding quadrant cosine. The resulting filtered image is shown in FIG. 10c, clearly showing space-local filtering with the amplitudes of the quadrant cosines being reduced by approximately 98-99% near the corresponding $(X_0, Y_0)$, but left substantially untouched elsewhere in the quadrant. It is noted that the horizontal dimension of each filtered region varies as the inverse of the f—wave-number of the quadrant cosine, and the vertical dimension as the inverse of the g—wave-number. This is a consequence of the composite nature of the filter. The information removed by the filtering is shown in FIG. 10d.

Figure 11:
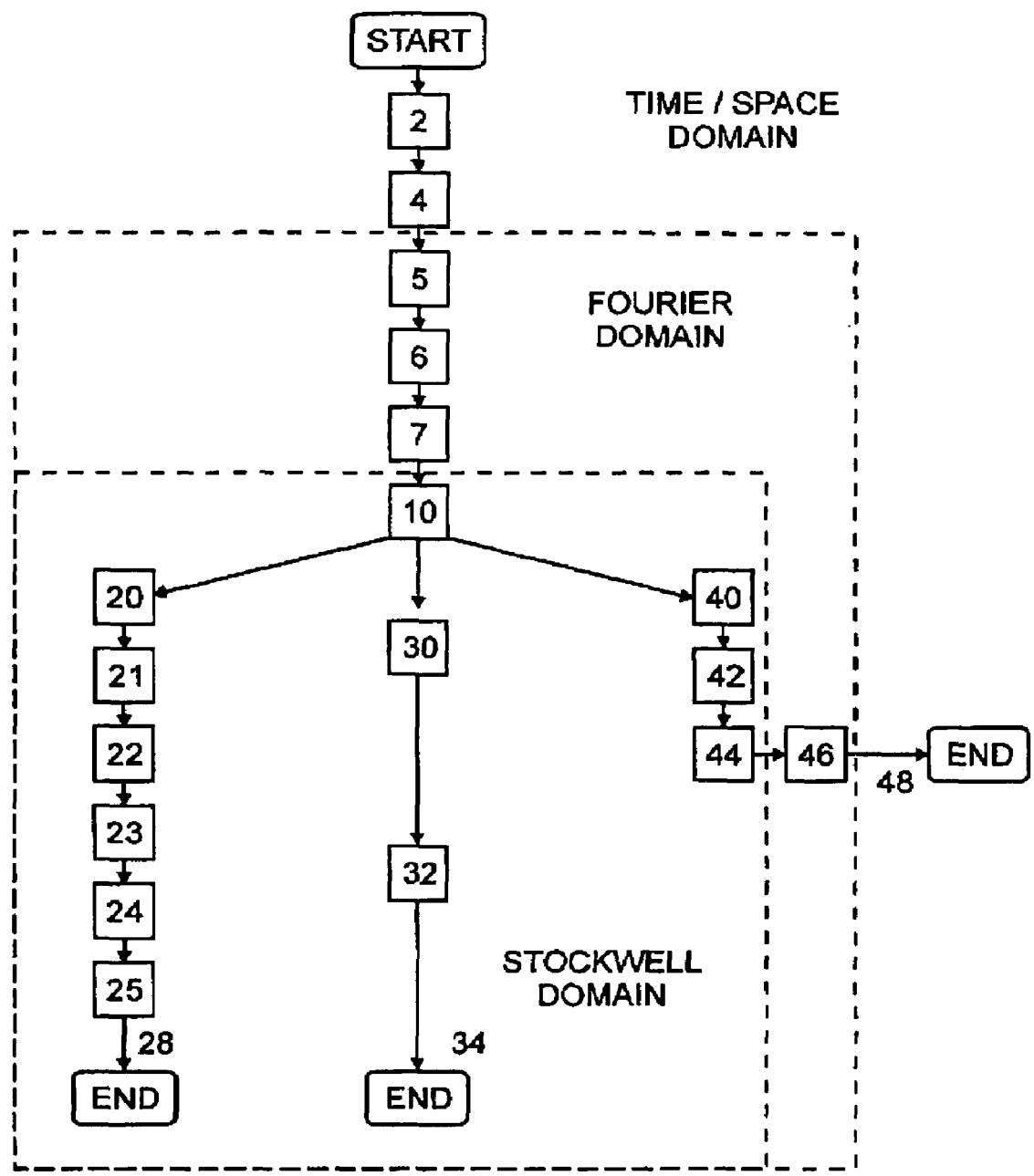
FIG. 11 is a flow diagram illustrating various methods of signal processing using a sparse approximation of the S-transform according to the invention; and, FIG. 12 is a simplified block diagram illustrating a system for signal processing using a sparse approximation of the S-transform according to the invention.
Figure 12:
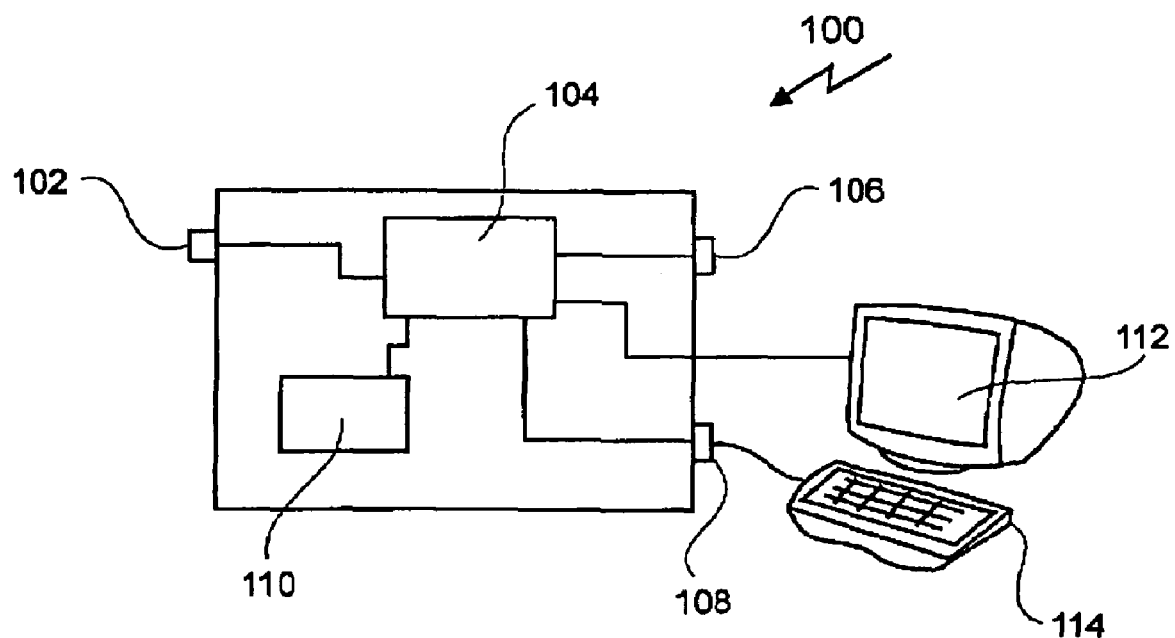

Referring to FIG. 11, various signal processing methods according to the invention are schematically illustrated in a flow diagram. A signal processing system 100 according to the invention for implementing the signal processing methods is shown in FIG. 12. The signal processing methods are based on the sparse approximation of the S-transform and the various procedures outlined above. Signal data having one or more dimension is received—block 2—at input port 102. Using electronic circuitry such as a processor 104 the signal data are then digitally processed. In a first procedure, the signal data are transformed into second signal data within a Stockwell domain based upon a sparse approximation of a S-transform of the signal data. This procedure includes transforming the signal data into Fourier domain—block 4; decimating the Fourier transformed signal data across frequency in case of time series signal data, or wavevector space in case of an image signal data—block 5; convolving the decimated Fourier transformed signal data over frequency based on Fourier convolution with a frequency domain window—block 7; and repeating the procedure of block 7 using different windows at selected frequencies—block 6. After this procedure the second signal data are represented in the Stockwell domain. The second signal data are then processed within the Stockwell domain to extract features therefrom—block 10. Processing of the second signal data in the Stockwell domain is highly beneficial since it allows space and/or time localization of the event spectra, thus, overcoming the deficiency of the standard Fourier analysis. The system 100 comprises a storage medium 110 having stored therein executable commands for execution on the processor 104 for performing the signal processing. Alternatively, the processor 104 comprises electronic circuitry designed for performing at least a portion of the signal processing in a hardware implemented fashion. The system 100 further comprises an output port 106 for providing the processed signal data for storage or further processing.

In a first method of signal processing according to the invention at least a point in time or space is selected for which a local spectrum is to be determined—block 20. The selection is performed by a user viewing, for example, a graphical representation of the signal data on display 112 and providing control commands via port 108—connected, for example, to a keyboard 114—to the processor 104. Preferably, the display 112 is a graphical user interface facilitating user interaction during signal processing. Alternatively, the selection is performed by the processor based upon predetermined selection criteria. After the selection process—block 20—at least a portion of the second signal data are determined for calculating the at least a local spectrum—block 21. The at least a portion of the second signal data is then interpolated in time or space producing at least a set of first interpolated data—block 22. Phase of the at least a set of first interpolated data is then adjusted—block 23—prior interpolation in frequency—block 24—producing data indicative of at least a local spectrum 28. In a final step phase of the data indicative of the at least a local spectrum is adjusted—block 25. The data indicative of the at least a local spectrum are then, for example, processed to provide a graphical representation of the at least a local spectrum on the display 112.

In a second method of signal processing according to the invention at least a frequency of the second signal data is selected—block 30. The second signal data related to the at least a frequency is then interpolated in time or space producing at least a voice 34 related to the at least a frequency—block 32. As above, the selection is performed either by a user or by the processor 104 based upon predetermined selection criteria.

Optionally, the first and second method of signal processing are combined producing, for example, a set of local spectra having a predetermined spacing combined with a set of voices having a predetermined spacing. Alternatively, the local spectra and voices are selected for representing a localized event in a predetermined time interval or space region in the Stockwell domain.

In a third method of signal processing according to the invention at least a filter function in dependence upon frequency and time or space is determined—block 40. The second signal data are then multiplied with the at least a filter function—block 42—and transformed into the Fourier domain—block 44—producing filtered Fourier domain data. In a final step the filtered Fourier domain data are then transformed into the time or space domain—block 46—providing filtered time series signal data or filtered image data 48. The at least a filter function is determined by a user viewing, for example, a graphical representation of the signal data on the display 112. Alternatively, determination of the at least a filter function is performed by the processor 104 based upon predetermined criteria.

The signal processing methods and system according to the invention are highly beneficial in numerous applications by substantially reducing the resources required to perform signal processing based on the S-transform. For example, employment of the S-transform is enabled for filtering of noise components and artifacts from MRI signal data as well as for texture analysis of MRI image data in a clinical setting.

Numerous other embodiments of the invention will be apparent to persons skilled in the art without departing from the spirit and scope of the invention as defined in the appended claims.

What is claimed is:

1. A method for processing signal data indicative of a characteristic of an object comprising:
   receiving the signal data;
   transforming the signal data into second signal data within a Stockwell domain based upon a sparse approximation of an S-transform of the signal data;
   processing the second signal data within the Stockwell domain to extract features therefrom;
   generating third signal data indicative of the extracted features; and,
   providing the third data.

2. A method for processing signal data indicative of a characteristic of an object as defined in claim 1 wherein transforming the signal data into second signal data within a Stockwell domain comprises:
   transforming the signal data into Fourier domain;
   decimating the Fourier transformed signal data across one of time and space; and,
   convolving the decimated Fourier transformed signal data with a frequency-dependent window at specific values of frequency based on Fourier-domain convolution.

3. A method for processing signal data indicative of a characteristic of an object as defined in claim 2 wherein decimating the Fourier transformed signal data across one of time and space comprises constant-Q band-pass filtering the Fourier transformed signal data.

4. A method for processing signal data indicative of a characteristic of an object as defined in claim 2 wherein the Fourier transformed signal data related to lowest frequencies are retained.

5. A method for processing signal data indicative of a characteristic of an object as defined in claim 4 wherein harmonics are omitted when a modulus of the frequency is greater than a predetermined value.

6. A method for processing signal data indicative of a characteristic of an object as defined in claim 5 wherein the retained harmonics are spaced based on a standard deviation of a Fourier-domain form of a Gaussian window function of the S-transform.

7. A method for processing signal data indicative of a characteristic of an object as defined in claim 1 comprising:
 selecting at least a point in one of time and space;
 determining at least a portion of the second signal data for determining a local spectrum at the at least a point;
 interpolating the at least a portion of the second signal data in one of time and space producing at least a set of first interpolated data; and,
 interpolating the at least a set of first interpolated data in frequency producing data indicative of the at least a local spectrum.

8. A method for processing signal data indicative of a characteristic of an object as defined in claim 7 comprising:
 adjusting phase of the at least a set of first interpolated data; and,
 adjusting phase of the data indicative of the at least a local spectrum.

9. A method for processing signal data indicative of a characteristic of an object as defined in claim 1 comprising:
 selecting at least a frequency of the second signal data; and,
 interpolating the second signal data related to the at least a frequency in one of time and space producing data indicative of at least a voice related to the at least a frequency.

10. A method for processing signal data indicative of a characteristic of an object as defined in claim 1 comprising:
 determining at least a filter, the at least a filter being a function in dependence upon frequency and one of time and space;
 multiplying the second signal data with the at least a filter producing third signal data; and,
 transforming the third signal data into Fourier domain producing filtered Fourier domain data.

11. A method for processing signal data indicative of a characteristic of an object as defined in claim 10 comprising:
 inverse Fourier transforming the filtered Fourier domain data into filtered signal data in one of time and space domain.

12. A storage medium having stored therein executable commands for execution on a processor, the processor when executing the commands performing:
 receiving the signal data;
 transforming the signal data into second signal data within a Stockwell domain based upon a sparse approximation of a S-transform of the signal data; and,
 processing the second signal data within the Stockwell domain to extract features therefrom;
 generating third signal data indicative if the extracted features; and,
 providing the third signal data.

13. A storage medium as defined in claim 12 having stored therein executable commands for execution on a processor, the processor when executing the commands performing:
 determining at least a portion of the second signal data for determining a local spectrum for at least a point in one of time and space;
 interpolating the at least a portion of the second signal data in one of time and space producing at least a set of first interpolated data;
 adjusting phase of the at least a set of first interpolated data;
 interpolating the at least a set of first interpolated data in frequency producing the at least a local spectrum; and,
 adjusting phase of the at least a local spectrum.

14. A storage medium as defined in claim 12 having stored therein executable commands for execution on a processor, the processor when executing the commands performing:
 selecting at least a frequency of the second signal data; and,
 interpolating the second signal data related to the at least a frequency in one of time and space producing at least a voice related to the at least a frequency.

15. A storage medium as defined in claim 12 having stored therein executable commands for execution on a processor, the processor when executing the commands performing:
 determining at least a filter, the at least a filter being a function in dependence upon frequency and one of time and space;
 multiplying the second signal data with the at least a filter producing third signal data;
 transforming the third signal data into Fourier domain producing filtered Fourier domain data; and,
 inverse Fourier transforming the filtered Fourier domain data into one of time and space domain.

16. A system for processing signal data indicative of a characteristic of an object comprising:
 an input port for receiving the signal data, the signal data being one of time series signal data and image signal data;
 a processor in communication with the first port for:
  transforming the signal data into second signal data within a Stockwell domain based upon a sparse approximation of a S-transform of the signal data; and,
  processing the second signal data within the Stockwell domain to extract features therefrom;
  generating third signal data indicative of the extracted features; and,
 an output port in communication with the processor for providing the third signal data.

17. A system for processing signal data indicative of a characteristic of an object as defined in claim 16 wherein the processor comprises electronic circuitry designed for performing at least a portion of transforming the signal data into second signal data and processing the second signal data.

18. A system for processing signal data indicative of a characteristic of an object as defined in claim 16 comprising a control port in communication with the processor for receiving control commands for controlling of transforming the signal data into second signal data and processing the second signal data.

19. A system for processing signal data indicative of a characteristic of an object as defined in claim 18 comprising a graphical display in communication with the processor for displaying the third signal data in a human comprehensible fashion.

20. A system for processing signal data indicative of a characteristic of an object as defined in claim 19 wherein the graphical display comprises a graphical user interface.

21. A method for processing signal data indicative of a characteristic of an object as defined in claim 1 comprising using a transducer sensing the characteristic of the object and providing the signal data in dependence thereupon.

22. A method for processing signal data indicative of a characteristic of an object as defined in claim 1 comprising providing the third signal data for at least one of storing the third signal data and further processing the third signal data to provide a human comprehensible graphical representation thereof.

23. A storage medium as defined in claim 12 having stored therein executable commands for execution on a processor, the processor when executing the commands performing:

providing the processed second signal data for at least one of storing the processed second signal data and further processing the processed second signal data to provide a human comprehensible graphical representation thereof.

24. A system for processing signal data indicative of a characteristic of an object as defined in claim 16 wherein the output part is communication with at least one of a storage medium for storing the third signal data and a graphical display for displaying the third signal data in a human comprehensible graphical fashion.

25. A system for processing signal data indicative of a characteristic of an object as defined in claim 16 comprising a transducer in communication with the input port for sensing the characteristic of the object and providing the signal data in dependence thereupon.

* * * * *